United States Patent [19]

Wahlmann

[11] Patent Number: 4,668,013
[45] Date of Patent: May 26, 1987

[54] HINGE STRUCTURE FOR SEAT WITH ADJUSTABLE BACKREST

[75] Inventor: Ernst Wahlmann, Meerbeck, Fed. Rep. of Germany

[73] Assignee: P.A. Rentrop, Hubbert & Wagner Fahrzeugausstatungen GmbH & Co. KG, Stadthagen, Fed. Rep. of Germany

[21] Appl. No.: 797,792

[22] Filed: Nov. 14, 1985

Related U.S. Application Data

[63] Continuation of Ser. No. 511,132, Jul. 6, 1983, abandoned.

[30] Foreign Application Priority Data

Jul. 16, 1982 [DE] Fed. Rep. of Germany ....... 3226714

[51] Int. Cl.$^4$ .......................... B60N 1/06; F16H 55/18
[52] U.S. Cl. ...................................... 297/362; 74/805
[58] Field of Search .................. 297/362; 74/804, 805, 74/409

[56] References Cited

U.S. PATENT DOCUMENTS

| 1,770,035 | 7/1930 | Heap . | |
| 3,323,497 | 6/1967 | Parschke | 74/805 X |
| 3,673,891 | 7/1972 | Pickles . | |
| 3,807,797 | 4/1974 | Klingelhofer | 297/362 |
| 4,196,931 | 4/1980 | Werner . | |
| 4,227,741 | 10/1980 | Goss et al. | 297/362 |
| 4,345,792 | 8/1982 | Shephard | 297/362 |
| 4,439,053 | 3/1984 | Pelz | 297/362 |
| 4,453,767 | 6/1984 | Walk et al. | 297/362 |

FOREIGN PATENT DOCUMENTS

| 2130873 | 6/1971 | Fed. Rep. of Germany . | |
| 1680128 | 11/1971 | Fed. Rep. of Germany . | |
| 2028723 | 12/1971 | Fed. Rep. of Germany . | |
| 2041302 | 2/1972 | Fed. Rep. of Germany | 297/362 |
| 1575231 | 7/1969 | France . | |
| 2398638 | 7/1978 | France . | |
| 3398637 | 7/1978 | France . | |

Primary Examiner—Peter A. Aschenbrenner
Assistant Examiner—Peter R. Brown
Attorney, Agent, or Firm—Pollock, Vande Sande & Priddy

[57] ABSTRACT

In hinge structures for seats having adjustable backrests, a hinge piece (8) attached to the fixed seat (12) and a hinge piece (6) attached to the adjustable backrest (13) are connected on a pivot axle (7) with an eccentric portion (7a). One hinge piece has inwardly projecting teeth (6a) defining a toothed zone into which extend the outwardly projecting teeth (8a) of a spur gear zone of the second hinge piece, thus forming a wobble-plate gear unit. In addition to both of these toothed zones, there is provided on the first hinge piece a second inwardly projecting toothed zone (6b) concentric with and axially displaced from the first inwardly projecting toothed zones and meshed with a second spur gear zone (8b) concentric with and axially displaced from the first spur gear zone.

14 Claims, 9 Drawing Figures

HINGE STRUCTURE FOR SEAT WITH ADJUSTABLE BACKREST

This is a continuation of co-pending application Ser. No. 511,132 filed on July 16, 1983, now abandoned.

DESCRIPTION

1. Technical Field

The invention concerns a hinge structure for seats with adjustable backrests, especially motor vehicle seats in which a hinge piece attached to the fixed seat and a hinge piece attached to the pivotable backrest are connected on a pivot axle having an eccentric portion. One hinge piece has inwardly projecting teeth into which extend the outwardly projecting teeth of a spur gear on the other hinge piece, thereby forming a wobble-plate gear unit.

2. Background Art

In a known hinge structure of this general type as shown in German Patent Specification No. 16 80 128, hinge pieces must be made from stock material which is thicker than actually necessary from the standpoint of stability, just to provide enough material to form teeth with sufficiently large axial width. The excess stock material undesirably contributes to the weight and cost of the hinge structure.

To reduce the overall thickness of the hinge structure and the connected protuberances on which the inwardly or outwardly projecting teeth are formed, it is also known that the radially extending interior side of a protuberance can be arranged coplanar with the radially extending exterior side of the accompanying hinge piece. As a result, the wall bridges between a protuberance and the remainder of the hinge piece are stock material zones which radially and circumferentially encompass the tooth gaps of the inwardly projecting teeth on one hinge piece and of the outwardly projecting teeth of the spur gear on the other hinge piece. Also in this known solution, the primary determining factor for selection of the thickness of the hinge pieces is the required axial width of the toothed zone. In this construction, the width of the toothed zone corresponds to the thickness of the stock material.

DISCLOSURE OF THE INVENTION

Proceeding from this state of the art, the object of the invention is to make a hinge structure of the aforementioned type in which the axial width of the toothed zone is greater than the thickness of the stock material.

According to the invention, a second, inwardly projecting toothed zone is arranged concentrically with an axially displaced from a first inwardly projecting toothed zone on a first hinge piece. This second, inwardly projecting toothed zone has a smaller diameter than the first inwardly projecting toothed zone and engages the outwardly projecting teeth of a second spur gear on the second hinge piece. The second spur gear is arranged concentrically with and axially displaced from a first spur gear on the second hinge piece. The second spur gear has a smaller diameter than the first. The pitch angles of both toothed zones of each hinge piece are equal. With this type of toothing, the thickness of the starting material can be significantly reduced from that of the known construction previously described. Sufficiently wide effective tooth areas result from the two staggered toothed zones on each hinge piece. Additional concentric, axially displaced toothed zones also may be used on each hinge piece without departing from the scope of the invention.

According to a further feature of the invention, the second spur gear is connected for limited rotation relative to the first spur gear. Such construction permits a virtually backlash- or play-free arrangement of both toothed zones. Here, it is sufficient to arrange the one spur gear slightly turned in relation to the other spur gear.

Preferably the second spur gear is arranged concentrically with the first spur gear. According to a further feature of the invention, the turning angle between the first spur gear and the second spur gear is limited by stops. Preferably, resilient elements are provided between the stop parts and the two spur gears. These resilient elements permit application of torque acting in the direction of rotation. In an advantageous embodiment, a pin is provided on the second hinge piece which penetrates into an aperture of the second spur gear.

With the hinge fitting according to the invention, the problem of sufficient dimensioning of the toothed zones in comparatively thin stock material is solved in an extremely simple way. The staggered toothed zones, just as in the case of the familiar simple toothed zones, can be produced with precision cutting techniques.

BRIEF DESCRIPTION OF THE DRAWINGS

Two preferred embodiments of the invention are described separately in the following specification with the aid of the drawings in which.

BEST MODE FOR CARRYING OUT THE INVENTION

Figure 1:
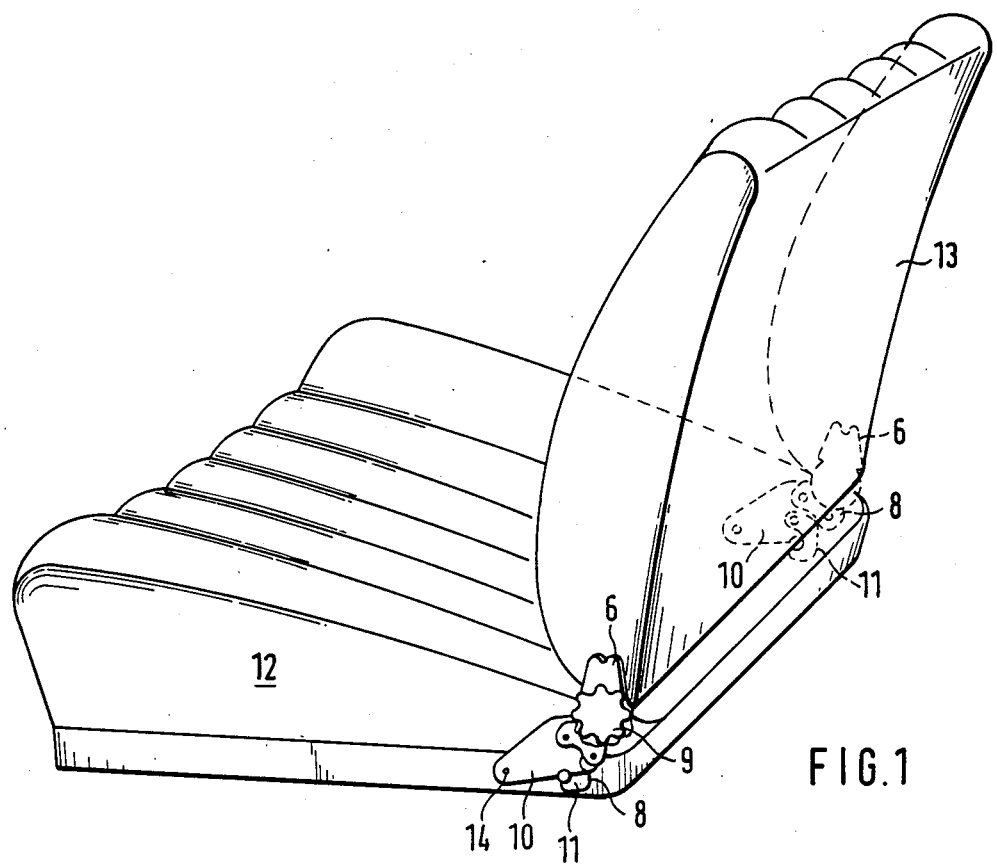
FIG. 1 shows a motor vehicle seat with a hinge fitting.
Figure 2:
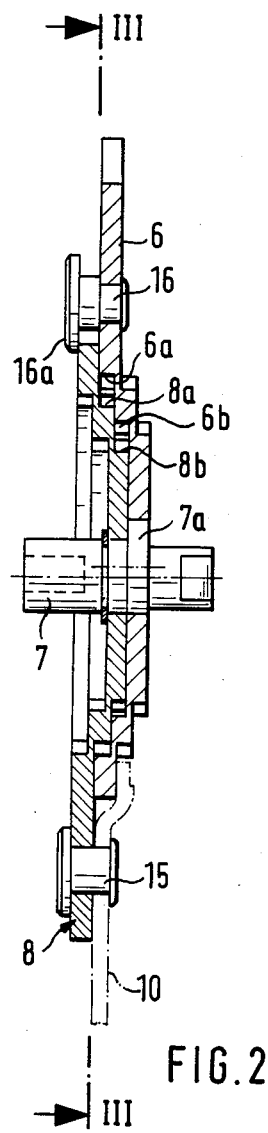
FIG. 2 shows a longitudinal section through the hinge fitting according to the invention, taken on line II—II of FIG. 3.
Figure 3:
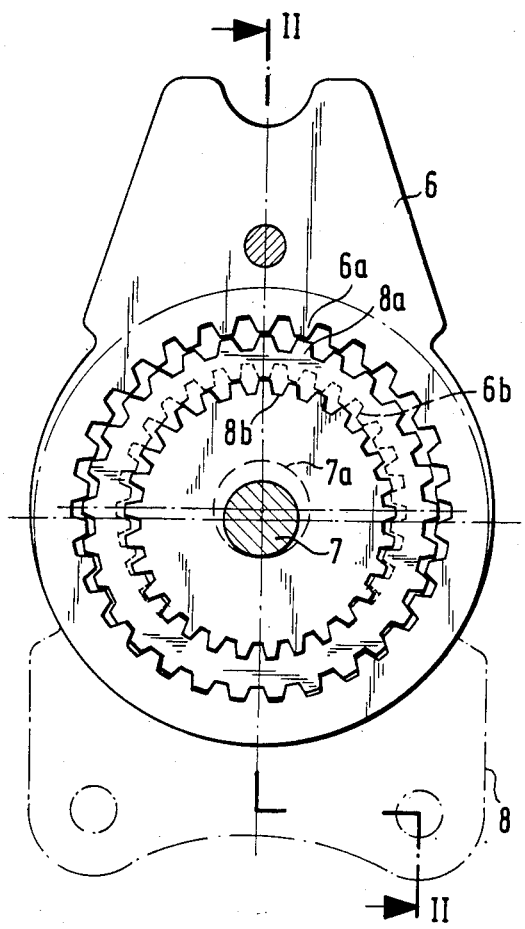
FIG. 3 shows a section through the hinge fitting taken on line III—III of FIG. 2.

As shown in FIG. 1, backrest 13 is hinged to a motor vehicle seat 12. A first hinge piece 6 is fastened to backrest 13 and a second hinge piece 8 is fixedly connected with seat 12. Hinge piece 8 is fixed to a fitting 10 and rotatably supports backrest 13 on a swivel axle 7, as shown in FIGS. 2 and 3. Locking of backrest 13 is accomplished with the help of a latch 11. Although the hinge structure of the invention is illustrated for use with a motor vehicle seat, it may also be used in other seat structures provided with a pivotable backrest.

Figure 4:
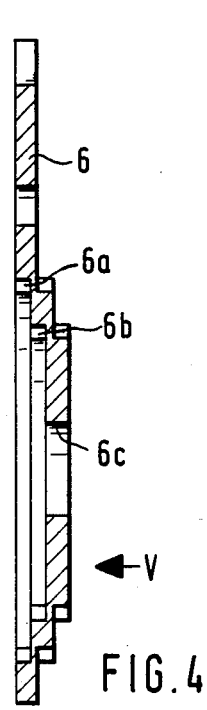
FIG. 4 shows a longitudinal section taken on line IV—IV of FIG. 5 through the second hinge piece.
Figure 5:
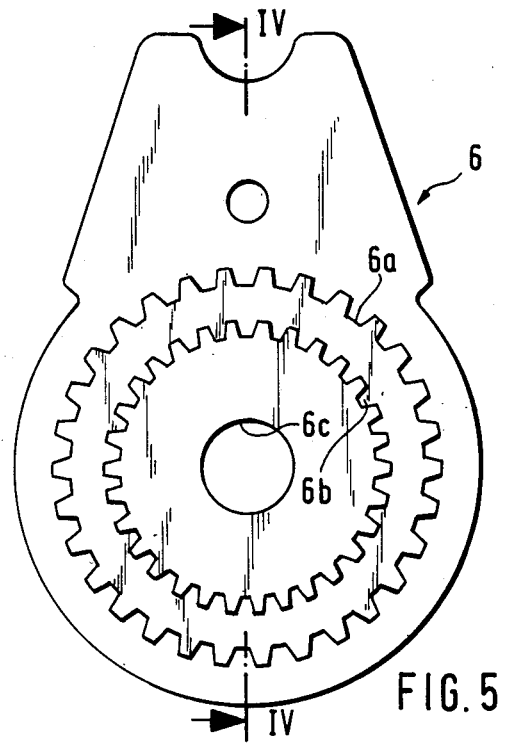
FIG. 5 shows a view of the second hinge piece in the direction of arrow V of FIG. 4.
Figure 6:
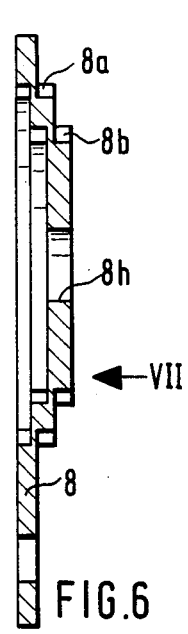
FIG. 6 shows a section taken on line VI—VI of FIG. 7 through the first hinge piece.
Figure 7:
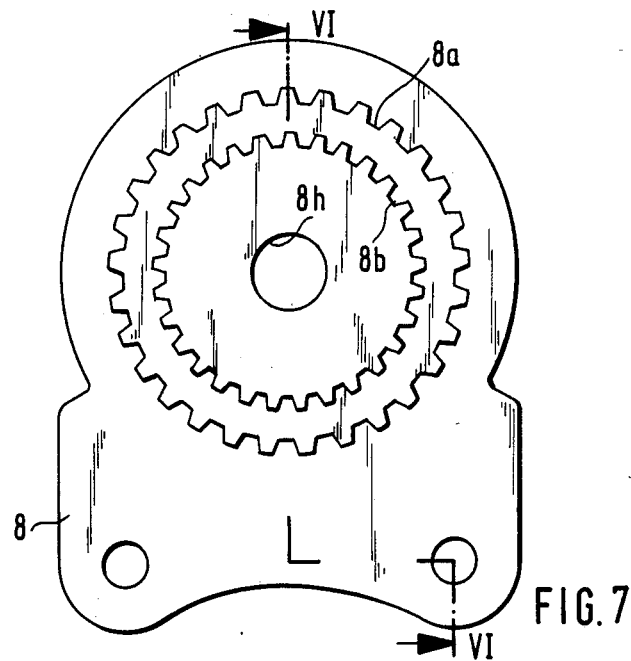
FIG. 7 shows a view in the direction of arrow VII of FIG. 6.

A hand wheel 9 is fixedly connected to swivel axle 7 which has a cylindrical body rotatably secured in a central bore 8h of second hinge piece 8, as shown in FIGS. 2, 6 and 7. Swivel axle 7 has an enlarged eccentric portion 7a which is positioned in a central bore 6c of hinge piece 6, as shown in FIGS. 2, 4 and 5. Bore 6c is eccentric to bore 8h in the assembled hinge.

Hinge piece 6 is provided with two concentric, axially displaced, inwardly projecting toothed zones 6a and 6b. Toothed zones 6a, 6b are engaged, respectively, with the outwardly projecting teeth of two concentric, axially displaced spur gear zones 8a and 8b on hinge piece 8.

The crown lines of the spur gear zones 8a, 8b are at least a tooth height smaller in diameter than the root lines of the associated inwardly projecting toothed zones 6a, 6b. The eccentricity of eccentric portion 7a approximately accounts for the difference between the root lines of inwardly projecting toothed zones 6a, 6b and the crown lines of spur gear zones 8a, 8b. This difference in diameters is chosen so that an automatic locking is assured between the inwardly projecting toothed zones and the spur gear zones.

Fitting 10 is connected to hinge piece 8 via two rivets. Moreover, a rivet 16 is fixedly connected to piece 6 and provided with an enlarged head 16a which overlaps the rounded edge at the top of hinge part 8, as shown in FIG. 2. Head 16a permits rotation of hinge piece 6 about axle 7 but holds hinge pieces 6 and 8 in proper axial engagement. Rotation of the swivel axle 7 with eccentric portion 7a results from manually twisting hand wheel 9, which causes hinge piece 6 to rotate to reposition backrest 13. Stationary spur gear zones 8a, 8b mesh with inwardly projecting toothed zones 6a, 6b during rotation.

Figure 8:
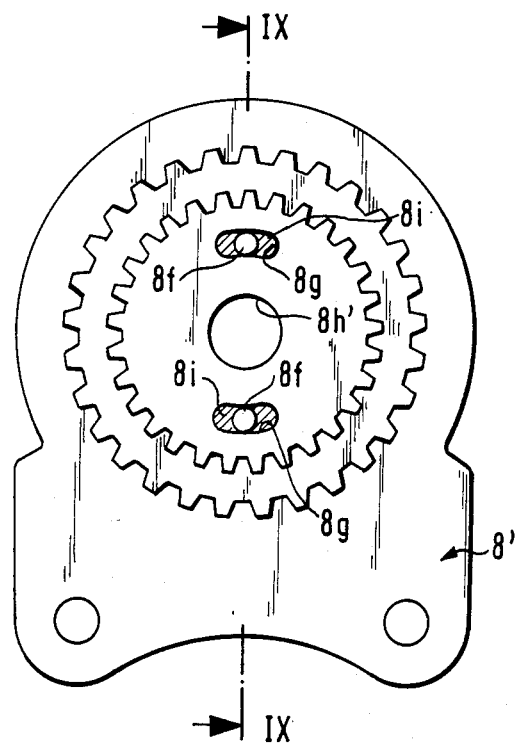
FIG. 8 shows a view analogous to FIG. 7 of a second embodiment of the first hinge piece.
Figure 9:
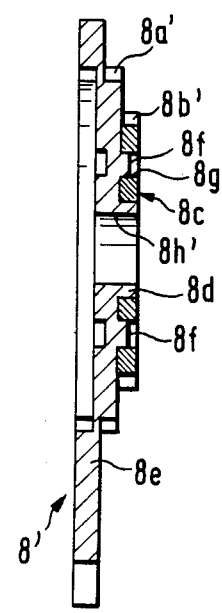
FIG. 9 shows a section taken on line IX—IX of FIG. 8.

The embodiment according to FIGS. 8 and 9 corresponds in its basic construction to the embodiment of first hinge piece 8 shown in FIGS. 6 and 7. Parts in the embodiments of FIGS. 8 and 9 corresponding to one another in FIGS. 7 and 6 are distinguished by prime designations.

The first hinge piece 8' has a fixed portion 8e from which extends a first spur gear zone 8a'. At its center hinge piece 8' has a central bore 8h' surrounded by an annular boss 8d. A gear wheel 8c, which has a second spur gear zone 8b', is rotatably mounted on boss 8d. Gear wheel 8c has two arcuate apertures 8g lying across from one another which are penetrated by pins 8f of hinge piece 8'. The space remaining next to pin 8f within apertures 8g is filled with a resilient material 8i. The movable mounting of gear wheel 8c on fixed zone 8e permits an angular movement of the second spur gear zone 8b' across from the first spur gear zone 8a' and thereby the compensation of a possible backlash.

Having described my invention in sufficient detail to enable those skilled in the art to make and use it, I claim:

1. An improved hinge structure for use with seats having a stationary seat portion and a pivotable backrest, said hinge structure comprising:
   a first hinge piece made of a stock material of predetermined thickness having a first spur gear having outwardly projecting teeth and a second spur gear having outwardly projecting teeth said second spur gear being concentric with and axially displaced from said first gear, said first gear having a greater diameter than said second gear;
   a first bore in said first hinge piece;
   a second hinge piece having a first internal gear having inwardly projecting teeth for engagement with said first spur gear and a second internal gear having inwardly projecting teeth for engagement with said second spur gear, said second internal gear being concentric with and axially displaced from said first internal gear;
   a second bore in said second hinge piece;
   a pivot axle having an eccentric portion, said axle pivotable joining said hinge pieces with said eccentric portion rotatably extending into one of said first and second bore, whereby rotation of said pivot axle causes relative movement between said spur gears and said internal gears whereby said first and second spur gears provide greater axial width of tooth area engagement than said thickness of said stock material resulting in increased mechanical strength of the engagement of said first and second hinge pieces.

2. A hinge structure according to claim 1, wherein said second spur gear zone is secured in a concentric arrangement in the center of said first spur gear zone.

3. An improved hinge structure for use with seats having a stationary seat portion and a pivotable backrest, said hinge structure comprising:
   a first hinge piece having a first spur gear having outwardly projecting teeth and a second spur gear having outwardly projecting teeth, said second spur gear being concentric with and axially displaced from said first gear;
   a first bore in said first hinge piece;
   a second hinge piece having a first internal gear having inwardly projecting teeth for engagement with said first spur gear and a second internal gear having inwardly projecting teeth for engagement with said second spur gear said second internal gear being concentric with and axially displaced from said first internal gear;
   a second bore in said second hinge piece;
   a pivot axis having an eccentric portion, said axle pivotably joining said hinge pieces with said eccentric portion rotatably extending into one of said first and second bores, whereby rotation of said pivot axle causes relative movement between said spur gears and said internal gears wherein said second spur gear is rotatably connected with said first spur gear.

4. A hinge structure according to claim 3 wherein the rotation angle between said first spur gear and said second spur gear is limited by stops.

5. A hinge structure according to claim 4, wherein a pin is provided on said second hinge piece, said pin penetrating an aperture provided in said second spur gear.

6. A hinge structure according to claim 4, wherein resilient elements are provided between said stops of said spur gear.

7. A hinge structure according to claim 6, wherein a pin is provided on said second hinge piece, said pin penetrating an aperture provided in said second spur gear.

8. A hinge structure according to claim 3, wherein said second spur gear is secured in a concentric arrangement in the center of said first spur gear.

9. A hinge structure according to claim 8, wherein a pin is provided on said second hinge piece, said pin penetrating an aperture provided in said second spur gear.

10. A hinge structure according to claim 8, wherein the rotation angle between said first spur gear and said second spur gear is limited by stops.

11. A hinge structure according to claim 10, wherein a pin is provided on said second hinge piece, said pin penetrating an aperture provided in said second spur gear.

12. A hinge structure according to claim 10, wherein resilient elements are provided between said stops of said spur gear.

13. A hinge structure according to claim 12, wherein a pin is provided on said second hinge piece, said pin penetrating an aperture provided in said second spur gear.

14. A hinge structure according to claim 3, wherein a pin is provided on said hinge piece, said pin penetrating an aperture provided in said second spur gear.

* * * * *